United States Patent [19]
Blass

[11] 4,284,161
[45] Aug. 18, 1981

[54] SUSPENSION SYSTEM FOR SNOWMOBILES

[75] Inventor: Jaroslav Blass, Chaska, Minn.

[73] Assignee: Kawasaki Motors Corp., U.S.A., Santa Ana, Calif.

[21] Appl. No.: 963,913

[22] Filed: Nov. 24, 1978

[51] Int. Cl.³ .............................................. B62M 9/16
[52] U.S. Cl. .................................................... 180/184
[58] Field of Search ................ 180/184, 185, 190–192; 280/669, 694, 699

[56] References Cited

U.S. PATENT DOCUMENTS

| | | | |
|---|---|---|---|
| 1,276,035 | 8/1918 | Crane | 180/185 X |
| 1,404,052 | 1/1922 | Palm | 180/185 |
| 3,362,492 | 1/1968 | Hansen | 180/185 |
| 3,705,637 | 12/1972 | Harvey | 180/185 |
| 4,093,033 | 6/1978 | Rosch | 180/185 |

Primary Examiner—John J. Love
Assistant Examiner—Norman L. Stack
Attorney, Agent, or Firm—Poms, Smith, Lande & Rose

[57] ABSTRACT

A suspension system for a track driven vehicle such as a snowmobile, which has a vehicle body and a rigid frame, the suspension system pivotally interconnecting the body with the frame and comprising spaced front and rear support frames. The front support frame carries front torsion spring members having spring arms extending longitudinally along the rigid frame, each front torsion spring means having a spring arm engaging a cam surface on the rigid frame to vary the effective length of the torsion spring arm, the torsion spring arm being engageable with a cam edge of selected configuration to provide a desired progressive spring rate response to vertical displacement of the vehicle body with respect to the rigid frame. The rear support frame similarly includes torsion spring members each having spring arms for engagement with cam surfaces carried by the rigid frame to vary the effective length of the spring arm, the spring arm being engageable with a cam edge of selected configuration to provide a progressive spring rate during vertical displacement of the vehicle body with respect to the rigid frame. The rear support frame is pivotally connected to the rigid frame through side link members, one end of each link member having a pivotal connection with the rigid frame and the other end of each link member having a pivotal connection to a transverse member of the rear support frame. This transverse member is provided at a transverse axis of a bell crank lever system comprising a crank arm which is pivotally interconnected to a piston-cylinder shock absorber means carried by the rigid frame. The axis of the lower transverse member of the rear support frame is movable in an arc determined by the side links connecting the axis to the rigid frame and provides a movable, floating axis for the rear support frame to not only increase vertical displacement of the vehicle body but to also facilitate a selected progressive spring rate in the resilient suspension of the rear support frame.

15 Claims, 9 Drawing Figures

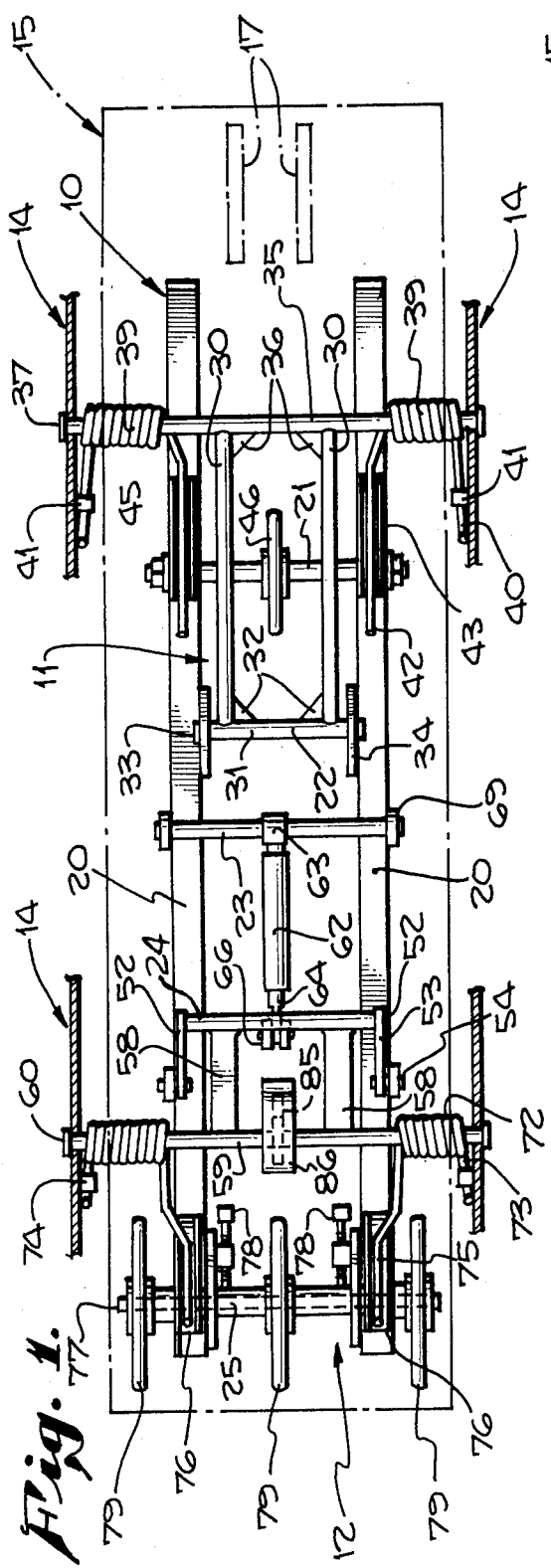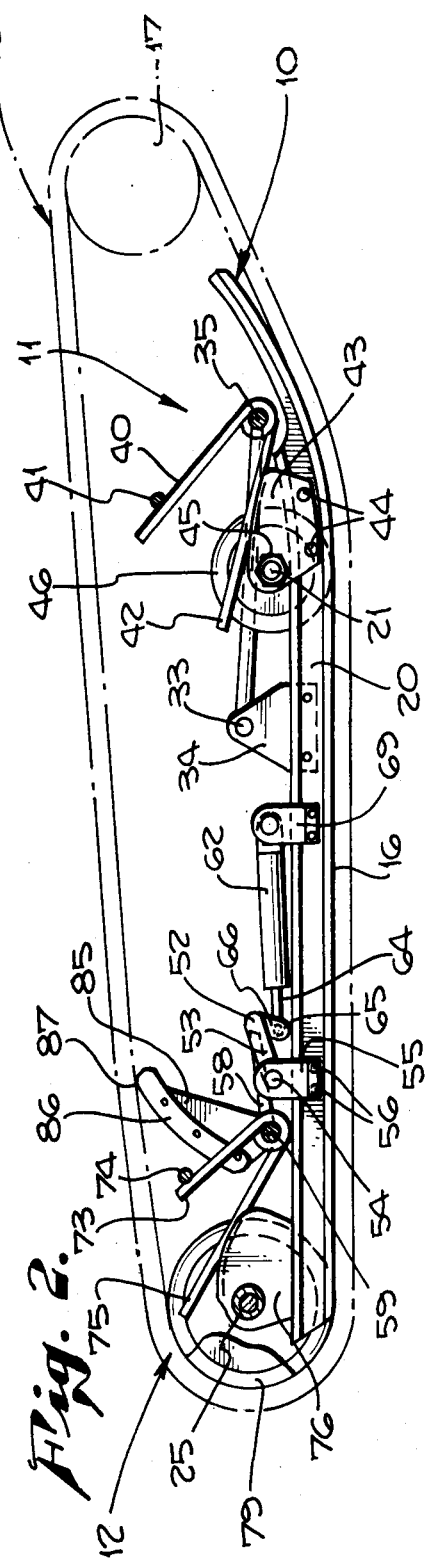

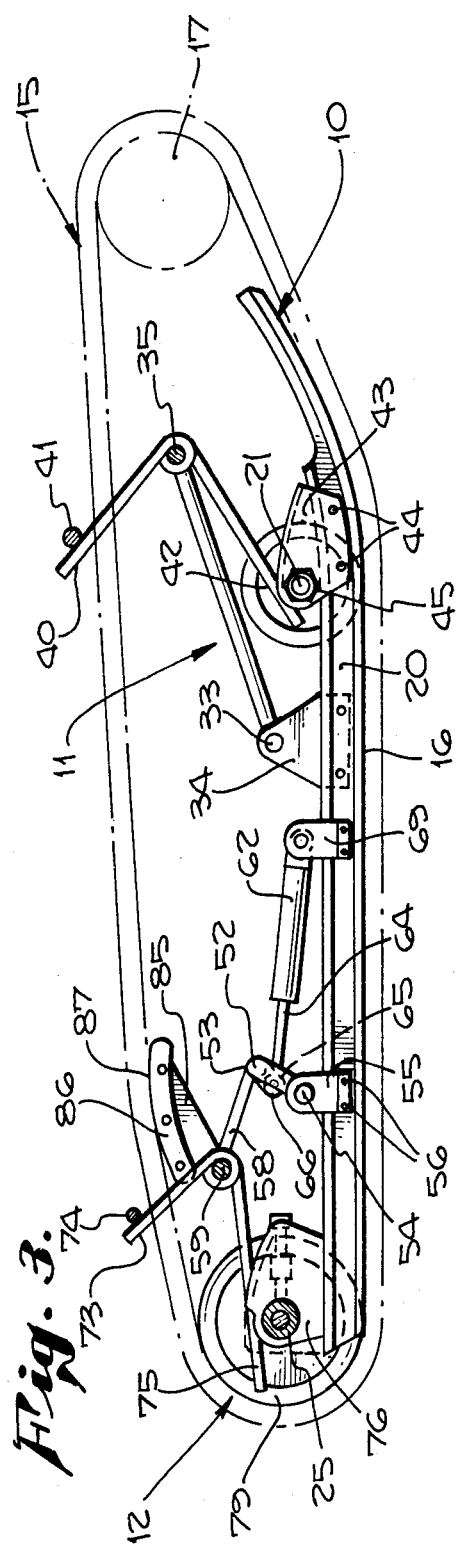
Fig. 3.
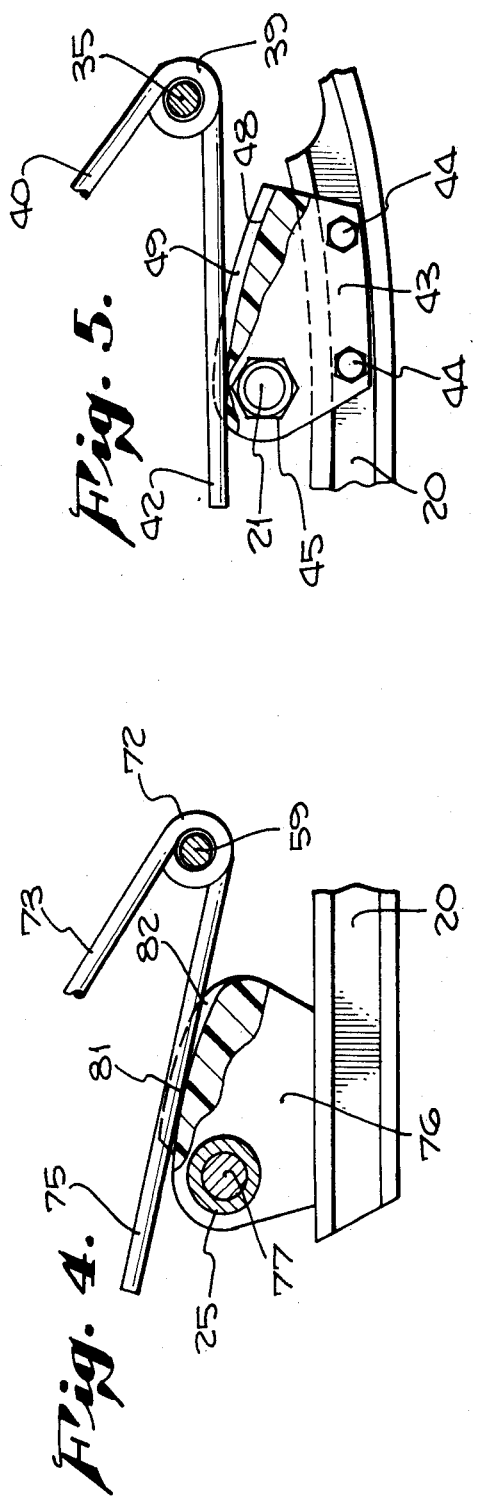
Fig. 5.
Fig. 4.

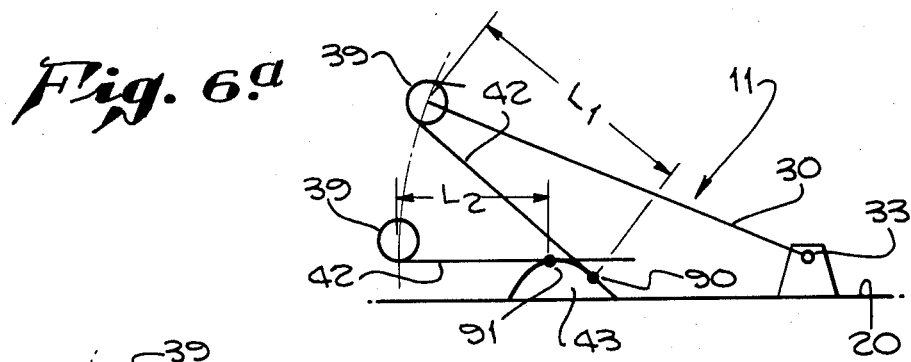
Fig. 6.a
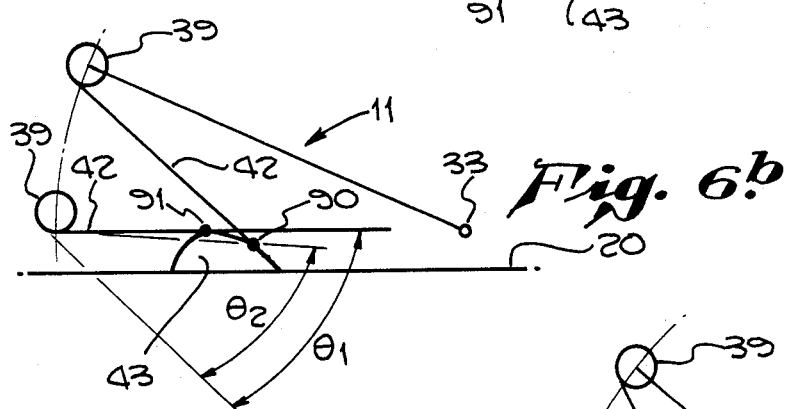
Fig. 6.b
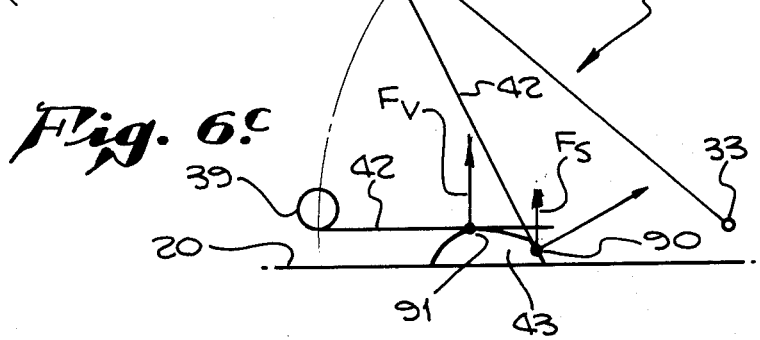
Fig. 6.c
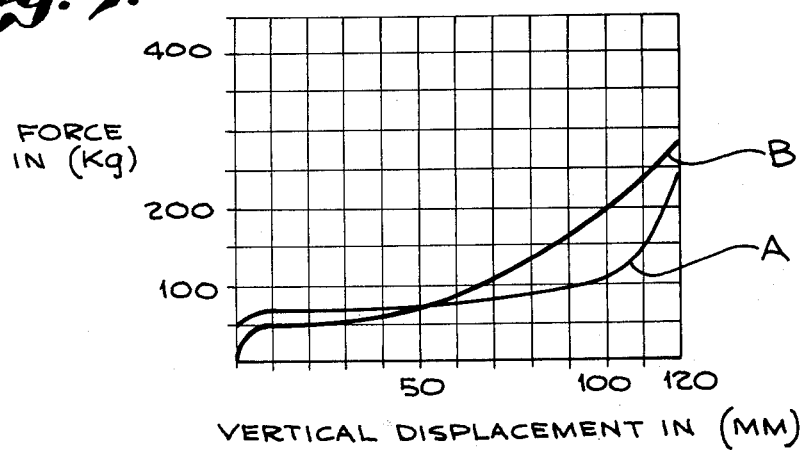
Fig. 7.

SUSPENSION SYSTEM FOR SNOWMOBILES

BACKGROUND OF INVENTION

This invention relates to a novel suspension system for track driven vehicles, such as snowmobiles, in which a rigid chassis frame is slidably supported on a ground engaging endless track, and a snowmobile body is yieldably resiliently supported from the rigid frame by front and rear suspension or support frames arranged in a particular manner.

In prior snowmobile suspension systems, various constructions were employed to yieldably resiliently support the snowmobile body and to improve its ride over varying types of terrain. Torsion springs on front and/or rear suspension frames were used; however, the geometry of the frames and springs relative to the rigid frame and body provided a flat spring response curve over the generally vertical travel of the body relative to the frame. In some instances, linkage means were incorporated with the suspension system to modify the spring response so that the snowmobile could accommodate varying loads and various sized irregularities and bumps in the ground surface (see U.S. Pat. No. 4,093,033). Shock absorbers and other dampening means were used to obtain a desired ride under widely varying terrain conditions. Such prior snowmobile suspension systems have been the subject of continual examination and analysis in order to minimize their disadvantages and to achieve improved ride characteristics.

Generally speaking, a snowmobile suspension system should have maximum suspension travel within the space limitations of snowmobile construction, a soft response or reaction to irregularities of small magnitude in the terrain, that is, a low spring rate or resistance of the suspension system reacting to such small irregularities; and a high response, spring rate or resistance to large irregularities in the terrain. Depending upon the distribution of loads carried by the snowmobile body and the desired ride characteristics, front and rear suspension frames or assemblies may be designed with different spring rates which may also vary in response along the length of travel of the suspension system.

SUMMARY OF INVENTION

The present invention contemplates a novel suspension system for snowmobiles wherein the desirable features mentioned above are readily achieved in an effective manner and without a complex suspension structure. The invention particularly contemplates novel front and rear suspension assemblies utilizing selectively configured cam members having cam faces cooperable with torsion spring arms providing a desired spring rate or response of the suspension system. In addition, suspension travel is increased by providing a floating pivot axis for one of the suspension assemblies, the pivot axis being connected to the rigid frame by link means.

The primary object of the present invention is to provide a novel snowmobile suspension system which is readily constructed to achieve resilient yieldable support of a snowmobile vehicle body to provide desired ride characteristics.

An object of the present invention is to provide a snowmobile suspension system having novel means for varying the spring rate of torsion spring means in either or both of front and rear suspension assemblies.

An object of the invention is to provide a suspension system in which a progressively varying spring rate is obtained by means for varying the effective length of one of the torsion spring arms.

Another object of the present invention is to provide a snowmobile suspension system wherein the means for varying the effective length of the torsion spring arm includes a cam means having a cam edge for engagement with a torsion spring arm.

A further object of the present invention is to provide a suspension system as mentioned above in which the configuration of the cam edge and the attitude or position of the torsion spring arm are correlated to provide a selected progressive spring rate response.

A still further object of the present invention is to provide a suspension system as mentioned above in which the pivotal axes connecting the support suspension assemblies to the rigid frame and to the snowmobile body are spaced in such a manner that the vehicle body supporting vertical force component is maximized for a selected position of the vehicle body with respect to the rigid chassis frame.

A still further object of the present invention is to provide a snowmobile suspension system wherein means are provided to maximize or increase suspension travel or excursion as compared with prior proposed suspension systems.

Still another object of the present invention is to provide such a means for maximizing suspension travel wherein such means includes a moving or floating pivot axis for one of the suspension support frames or assemblies.

A still further object of the present invention is to provide such a means for increasing suspension travel in which the floating pivot axis is provided at one end of a link member pivotally connected to the rigid frame means.

Still another object of the present invention is to provide means for increasing suspension travel wherein a shock or dampening means is pivotally connected by a lever crank to the floating axis.

The invention contemplates a novel snowmobile suspension system wherein rear and front suspension assemblies may include varying spring rate responses depending upon the vehicle loading and expected terrain conditions.

Various other objects and advantages of the present invention will be readily apparent from the following description of the drawings in which exemplary embodiments of the invention are shown.

IN THE DRAWINGS

FIG. 1 is a top plan view of a suspension system embodying this invention, the portions in section being part of the vehicle body and the phantom lines indicating drive sprockets and outline of an endless track.

FIG. 2 is a side view of FIG. 1, the suspension system being shown in fully collapsed condition.

FIG. 3 is a side view of the suspension system shown in FIG. 1, the suspension system being in generally normal position.

FIG. 4 is an enlarged fragmentary view of the rear cam and torsion spring arm.

FIG. 5 is a fragmentary enlarged side view of the front cam and front torsion spring arm.

FIG. 6a is a schematic diagram indicating the difference in effective length of the torsion spring arm as related to cam means.

FIG. 6b is a schematic sketch illustrating change in relative angular deflection of the torsional spring for displacement of the spring arm.

FIG. 6c is a schematic view similar to FIGS. 6a and 6b and illustrating change in magnitude of vertical supporting force components as a result of changing the angle of the spring arm.

FIG. 7 is a chart showing exemplary curves of force versus vertical displacement for progressively varying the spring rate of the torsion springs.

DETAILED DESCRIPTION OF PREFERRED EMBODIMENT

In FIGS. 1 and 2, the suspension system of the present invention includes a rigid chassis or frame means 10, a pivotally mounted suspension assembly or support front frame means 11, a pivotally mounted rear suspension assembly or support frame means 12, the front and rear support means 11 and 12 yieldably and resiliently supporting a vehicle body 14. An endless driven track means 15, shown in phantom lines, is provided with slidable engagement at 16 with rigid frame 10 in conventional snowmobile manner. Track 15 may be driven by drive sprockets 17 associated with power means, not shown, such driving arrangement not forming part of the present invention.

Rigid frame 10 may comprise a pair of spaced parallel elongated rails 20 having slightly upwardly curved portions at their front ends and interconnected by a plurality of longitudinally spaced front transverse members 21 and 22, an intermediate transverse member 23, and rear transverse members 24 and 25. Transverse members 24-25 inclusive also serve other functions with respect to the suspension system as described in detail hereinafter.

The bottom surface of each rail 20 may be provided with a suitable skid strip, not shown, for contacting a smooth inner surface of the endless driven track 15 as is well-known in the snowmobile art.

The front support frame means 11 may comprise a pair of parallel elongated longitudinally extending front support members 30 connected at their lower ends as by welding to a pivotally mounted tube 31 of transverse member 22 and reinforced by gusset plates 32. Tube 31 is ensleeved over and pivotally mounted about an axis provided by an interior through rod 33 which is supported by upstanding, aligned pedestals or brackets 34 secured in suitable manner to rails 20. Forward upper ends of front support members 30 are similarly welded to a transverse cylindrical tube 35 and reinforced by gussets 36. Transverse tube 35 may be ensleeved over a through rod 37 which extends outboardly of each side of rigid frame 10 for a suitable connection to vehicle body 14. Tube 35 is mounted for limited pivotal movement about the axis of rod 37. The pivotal connections of the support frame 11 about the axes of rods 33 and 37 provide swinging of front support frame 11 in a limited arc about the axis of rod 33.

Means for resiliently yieldably controlling movement of front support frame 11 in such limited arc may include front torsion springs 39 carried on outboard ends of transverse tube 35 and rod 37 which extend outboardly of rails 20. Each front spring 39 has a preselected number of helical turns therein to provide a desired torsion spring resistance. One end of each torsion spring 39 may terminate in a spring arm 40 which, in this example, extends rearwardly and upwardly for bearing against a spring arm keeper or bracket 41 suitably attached to vehicle body 14 at a predetermined location. Each torsion spring 39 also includes a rearwardly extending spring arm 42 of selected length for cooperable variable contact with front cam member 43 for progressively varying the spring rate of spring 39 as more fully described.

Front cam member 43 of suitable material may be secured by nut and bolt assemblies 44 to rail 20 at approximately the beginning of the upwardly curved front end portion of the rail. Cam member 43 may support ends of transverse member 21 which includes a through bolt assembly 45 and which supports between ends thereof a guide wheel 46 cooperable with the bottom lay of endless track 15.

Cam means 43, FIG. 5, is provided with a cam edge face 48 having a preselected curvature. Front torsion spring arm 42 is biased to contact cam edge face 48 at different points along the lengths of both arm 42 and cam edge face 48 as the front support frame 11 moves in its arc about the pivotal axis of rod 33. It will be readily apparent that the effective length of spring arm 42 is varied by such movement, the effective length being measured from the point of contact with the cam edge face 48 and the tangential point of contact of the other end of arm 42 with the outboard extension of transverse tube 35. The spring rate of the torsion spring 39 is thus varied in a progressive manner as more fully described hereafter.

Cam edge face 48 may be provided within an edge channel or groove 49 on cam member 43 for receiving and retaining arm 42 against lateral displacement thereof which might cause disengagement of cam arm 42 from cam member 43. Other suitable means may be provided for maintaining the cooperable relationship between arm 42 and cam edge face 48.

Rear support frame 12 of the suspension system is somewhat similar to the front support frame 11, except that means are provided for permitting movement of the lower pivotal axis of the rear support frame which corresponds to the pivotal axis provided by rod 33 of the front support frame. Rear support frame 12 includes transverse member 24, which has at each end a pivotal connection at 52 to an upper and rearwardly extending end of a link 53. Pivotal connections 52 to transverse member 24 define an axis about which rear support frame 12 may swing in a limited arc. Lower ends of links 53 are provided a pivotal connection at 54 to an upstanding bracket 55 secured as by nut and bolt assemblies 56 to rail 20 at a point spaced from the rear end of rail 20. Rear support frame 12 also includes a pair of rearwardly extending parallel longitudinal support members 58 suitably welded at their lower forward ends to member 24 and similarly secured at their rearward ends to transverse tube 59. Tube 59 may be ensleeved over a through rod 60 having outboard ends pivotally secured and mounted in vehicle body 14. Rear support frame 12 comprising transverse member 24, longitudinal members 58 and transverse tube 59 is adapted to be moved in an arc about the axis of member 24. The axis of member 24 is movable in an arc about the pivotal connections at 54 of links 53 with the brackets 55. Arcuate movement of the pivot axis of member 24 provides horizontal and vertical displacement of member 24 which also causes corresponding vertical and horizontal displacement of rear support frame 12, the function of which is described more fully hereafter.

Means for controlling and dampening such vertical and horizontal displacement of rear support frame 12 about the axis of member 24 is provided by a piston and cylinder type shock absorber 62. Shock absorber 62 may be positioned along the longitudinal axis of rigid frame 10 and pivotally connected at 63 to transverse member 23. The opposite end of shock absorber 62 which may include the end of piston rod 64 may be pivotally connected at 65 to the lower end of a bell crank arm 66. Crank arm 66 may be suitably secured as by welding to transverse member 24 and may form an included angle of slightly less than 90° with the parallel support members 58 of the support frame 12. The crank arm 64, transverse member 24, and pair of longitudinal support members 58 provide a bell crank lever system pivotally movable about the axis of member 24.

Intermediate transverse member 23 may be suitably supported from upstanding brackets 69 secured to rails 20 intermediate ends of rails 20.

As in the front support suspension frame means 11, the rear support frame 12 includes outboard extensions of tube 59 for carrying torsion spring means 72, each of a selected number of turns, to provide a predetermined spring resistance. Each torsion spring 72 includes an end spring arm 73 which may extend rearwardly and upwardly and may be retained by a suitable keeper or lug 74 positioned and secured to vehicle body 14. Each torsion spring 72 also includes a rearwardly extending rear spring arm 75 having cooperable contact and engagement with a rear cam member 76. Each rear cam member 76 includes a cam edge face 81 formed in the bottom of an edge groove or channel 82 which receives rear spring arm 75 for variable contacts therewith along the length of cam edge face 81 and spring arm 75 so as to vary the effective length of spring arm 75. A preselected variable spring rate of torsion spring 72 is thereby provided in a manner similar to that described with respect to the cooperable front cam members 43 and front spring arms 42.

Each cam member 76 may be slidably carried by rail 20 adjacent the rear end of rail 20. Each cam member 76 is provided with a connection to rear transverse member 25 which includes a through rod or bolt 77. Transverse member 25 including each cam member 76, is adjusted longitudinally of rails 20 by adjustment means 78 in well-known manner. Transverse member 25 may also carry a plurality of spaced guide wheels 79 for engagement with endless drive track 15 around the rear end of rigid frame 10.

Before describing the operation of the suspension system of this invention, it may be noted that transverse tube 59 of the rear support frame 12 may carry in selected fixed angular relation a bracket 85 located at the longitudinal center line of the snowmobile, bracket 85 carrying an elongated curved member 86 serving to maintain contact as at 87 with the undersurface of the top lay of endless track means 15. The curvature of arcuate member 86 is designed so that at varying positions of the suspension frame 12, that is particularly the tube 59, the edge surface of member 86 will maintain pressure contact on endless track 15 to maintain substantially constant tension therein during movement of the suspension system. Such constant tension system is described and claimed in copending application Ser. No. 46,097 and does not form part of this present invention.

Operation of the suspension system of the present invention may be described best by reference to FIGS. 6a, 6b and 6c and FIG. 7. In FIG. 6a is schematically illustrated a pivotal connection such as at 33 of the front suspension assembly to a rail 20. Front support frame or suspension assembly 11 carries torsion spring 39 provided with torsion arm 42. Torsion arm 42 contacts cam member 43 at a point indicated at 90. The effective length of spring arm 42 is then shown as $L_1$, that is the length between point of contact 90 on cam 43 to the axis of torsion spring 39. Such a relatively long effective length of spring arm 42 provides a relatively soft spring response of torsion spring 39 when the suspension frame is in elevated or virtually normal unloaded condition of the vehicle body. When the suspension frame 11 is pivoted downwardly about axis 33, such as occurs when the vehicle body is subject to load or when moving over relatively large bumps in the terrain, the torsion spring may assume the exemplary position where arm 42 contacts cam edge of cam member 43 at 91. The effective spring length of arm 42 is illustrated as $L_2$; and as compared to length $L_1$, effective length $L_2$ is substantially shorter. Such shortness or reduction in length of the effective length of the spring arm provides a stiffer response in the torsion spring 39. More spring resistance is desired as the suspension support frame 11 reaches its downward extremity of travel to reduce the impact or to avoid the impact upon bottoming out of the suspension frame under heavy loads or under very bumpy terrain. It will thus be apparent that a preselected design of the curvature of the cam edge of cam member 43 and the variation in points of contact therewith by spring arm 42 will vary the spring rate of torsion spring 39 in accordance with the preselected specification.

It will be apparent from FIG. 6a that the effective length of arm 42 is first dependent upon the distance between the axis of torsion spring 39 and the closest point of contact of arm 42 with the cam member 43 in its lowermost position or at one end of the path of travel of the suspension assembly 11. The cam edge on cam member 43 may be so configured as to vary the effective length of arm 42 to obtain a desired spring response during travel of the suspension assembly to its uppermost position. FIG. 7 illustrates an exemplary curve showing a progressive spring rate for a torsion spring in which vertical displacement of the upper end of the suspension assembly is plotted against force or spring resistance to such displacement. In the curve indicated by A, it will be noted that as vertical displacement reaches about 90 mm the curve swings rapidly upwardly so that in the last 10 mm of displacement the spring resistance increases from approximately 260 Kg to 400 Kg. It will be understood that the curve illustrated is exemplary only and that other types of curves may be desired for certain conditions and installations.

In FIG. 6b another feature of the spring arm and cam arrangement is illustrated. In the suspension of this invention, the angular deflection of the torsion spring for the same displacement of the front arm increases as indicated by the difference between angle $\theta_1$ and $\theta_2$. Such increase in angular deflection also serves to progressively increase the spring resistance of the torsion spring because of its effect on the twisting of the turns of the torsion spring about the axis of the torsion spring. Thus, in addition to the spring characteristics being modified by a change in effective length of spring arm 42 as described in FIG. 6a, spring resistance is further modified by the change or differential in angular deflection of the spring arm with respect to the turns of the torsion spring.

The relationship of spring arm 42 to the point of contact of spring arm 42 with cam member 43 also relates to the vertical force component of the spring which serves to support the front transverse arm, such as 35, of the front support suspension frame 11. As illustrated for exemplary purposes only in FIG. 6c, if the arm 42 is substantially horizontal and has a point of contact at 91 with the cam member 43, the vertical force component may be indicated by vector $F_v$. When the spring arm 42 is at an angle to the horizontal, as illustrated in FIG. 6c, and the torsion spring 39 is at its upper limit of suspension travel, the vertical component of force to support the upper end of the suspension frame 11 is indicated by a vector $F_s$. Vector $F_s$ is substantially shorter in length than vector $F_v$ and schematically illustrates the difference in supporting spring force of the suspension assembly.

While the FIGS. 6a, 6b, 6c are illustrative of a suspension system similar to that shown at the front suspension means 11, it will be readily apparent that the features thereof are incorporated in the rear suspension assembly 12, since the spring arm 75 thereof and cam member 76 cooperate in the same manner, although with perhaps different spring resistance depending upon the shape of the cam edge, the spacing of the points of contact of spring arm 75 with the cam edge and the axis of the torsion spring 72, and the location of the pivotal axis provided by transverse member 24. In the rear suspension assembly, it should be noted that while the distance between the axis of member 24 and the axis of tube 59 or torsion spring 72 remain the same the distance between the pivot axis of member 24 and the point of contact of spring arm 75 with the cam edge will vary because of the movable or floating relation of the axis of member 24 as a result of the link members 53 and their connection to member 24 and to brackets 55.

Rear suspension frame or assembly 12 provides somewhat different suspension characteristics than the front suspension assembly 11 because of the connection of shock absorber 62 to the crank arm and the crank arm's connection to transverse member 24. Thus, while the relationship between the effective spring arm length and point of contact with cam member 75 will react in a manner similar to that described for the front suspension assembly, the shock absorber 62 and its connection to the crank arm 66 will serve to further control the torsion spring response because of its dampening action on the travel of the upper end of the rear suspension assembly 12. In FIG. 7 the curve B in dotted lines is shown to illustrate a different force-vertical displacement relationship achieved by utilizing the features of this invention.

The suspension system of the present invention as described above provides means for progressively varying spring resistance of a suspension assembly to vertical displacement of the vehicle body in a selected manner to provide desired ride characteristics in a snowmobile. It will be apparent that the contour of the cam edges may be readily changed, that the spacing between certain pivotal axes may be readily modified, and that the length of the spring arms which coact with the cam edge may be readily determined so that a desired progressive spring rate is achieved by the torsion springs carried on the suspension assemblies.

It should be noted that in the rear suspension assembly 12, the pivotal movement of the rear frame members 58 about the axis of transverse member 24, which axis is subject to vertical and horizontal movement because of its support by pivoted link members 53, provides a floating axis which enables the suspension travel of tube 59 relative to the rigid frame to be increased from an exemplary 4 inches to an exemplary 5 inches. This amounts to an increase in suspension travel of approximately 20% and is achieved by the connecting of link members 53 to the axis of transverse member 24 which is at the center or angle of the bell crank system. In the restricted space available for suspension travel in a snowmobile, such increase in suspension travel is of great advantage.

All changes and modifications coming within the scope of the appended claims are embraced thereby.

I claim:

1. In a suspension system for a track driven vehicle including a vehicle body, the combination of:
   a rigid chassis means;
   suspension means interconnecting said vehicle body and said chassis means, said suspension means including
   a front support frame pivotally connected to said chassis means and to said body, said front support frame including a front transverse member having an axis;
   a front torsion spring having a coil about said axis carried at each end of said transverse member,
   each torsion spring having a spring arm extending from said coil;
   and cam means on the chassis means in operable contact with said spring arm whereby movement of said body and front transverse member relative to said chassis means changes the operable contact of said arm with the cam means and varies the response of said torsion spring to such movement.

2. In a suspension system as stated in claim 1 wherein, said cam means includes
   a cam surface for contact with said spring arm to vary the effective length of said arm to provide nonlinear spring response during movement of said body relative to said chassis means.

3. In a suspension system for a track driven vehicle including a vehicle body, the combination of:
   a rigid chassis means;
   suspension means interconnecting said vehicle body and said chassis means, said suspension means including
   a front support frame pivotally connected to said chassis means and to said body,
   said front support frame including a front transverse member;
   a front torsion spring carried at each end of said transverse member, each torsion spring having a longitudinally extending spring arm;
   means on said chassis means cooperable with each spring arm for varying the spring rate of said torsion springs;
   a rear support frame pivotally connected to said chassis means and to said body;
   said rear support frame including a rear transverse member;
   a rear torsion spring at each end of said rear transverse member,
   each rear torsion spring having a longitudinally extending rear spring arm;
   and means on said chassis means cooperable with said spring arm of said rear torsion spring for varying spring rate of said rear torsion spring.

4. In a suspension system as stated in claim 3 including means pivotally interconnecting said rear support frame to said chassis means, said pivotal interconnecting means including a link having a pivotal connection at one end to said chassis means and a pivotal connection at the other end to a second transverse member of said rear support frame.

5. In a suspension system as claimed in claim 4 including
a crank arm fixedly connected to said second transverse member of said rear support frame;
and shock absorbing means operably connected to said crank arm and carried by said chassis means.

6. In a suspension system as claimed in claim 3 wherein said means for varying the spring rate of said front and rear torsion springs includes
cam members secured to said chassis means,
said cam members having cam surfaces of selected contour extending longitudinally of the chassis means,
said spring arms contacting said cam surfaces at different locations therealong during vertical displacement of said suspension means to selectively modify the spring rate of said front and rear torsion springs.

7. In a suspension system for a track driven vehicle having a vehicle body and chassis means supported on a ground engaging track means, the combination of:
front and rear support frames;
means pivotally interconnecting each of said front and rear support frames to said chassis means and to said vehicle body;
front and rear torsion springs carried respectively by said front and rear support frames;
said torsion springs having spring arms extending along said chassis means;
and cam means carried by said chassis means for cooperable contact with said torsion spring arms,
said cam means having selected configurations for selectively modifying the response of said torsion spring means to vertical motion of said vehicle body.

8. In a suspension system as stated in claim 7 wherein
each of said torsion spring arms are positionable at a selected angle with respect to their contact with their respective cam surfaces whereby vertical body supporting forces are progressively increased as displacement of the vehicle body toward said chassis means increases.

9. In a suspension system for a track driven vehicle including a vehicle body and a rigid frame, the combination of:
a suspension frame means;
first means pivotally connecting one end of said suspension frame means to said rigid frame;
second means operably resiliently connecting the other end of said suspension frame means to said body;
said second means including spring means having a spring arm,
cam means on said rigid frame operably contacting said spring arm for varying response of said spring means
said first and second means providing relative vertical and horizontal components of movement of opposite ends of the suspension frame means.

10. In a suspension system as stated in claim 9 wherein said first pivotal connecting means includes
a link means pivoted on said rigid frame and having a pivotal connection to said one end of said suspension frame means.

11. In a suspension system as stated in claim 10 including
means for dampening movement of said suspension frame means in relation to said link means.

12. In a suspension system as stated in claim 11 wherein said dampening means includes
a shock absorber having one end pivotally connected with said rigid frame and its other end pivotally connected to said link means.

13. In a suspension system for a track driven vehicle including a vehicle body and a rigid frame, the combination of:
a suspension frame means having frame ends pivotally connected respectively to said body and rigid frame and relatively movable in support of said body under different load conditions;
spring means connected with one of said suspension frame ends,
said spring means including a spring arm extending at a selected angle from one of said suspension frame ends;
and cam means on said rigid frame in variable contact with said spring arm, said arm being biased against said cam means to vary the effective length of said arm, to vary the angular deflection of said arm, and to vary force components supporting said body for modifying response of said spring means to loads imparted thereto.

14. In a suspension system as stated in claim 13 wherein
the pivotal connection of one of the suspension frame ends includes a floating pivotal axis.

15. In a suspension system as stated in claim 14 including dampening means connected to said floating axis.

* * * * *